(12) United States Patent
Messner et al.

(10) Patent No.: US 6,790,513 B2
(45) Date of Patent: Sep. 14, 2004

(54) APPARATUS FOR APPLYING GLASS ELEMENTS TO A SUBSTRATE

(75) Inventors: Peter Messner, Volders (AT); Johannes Graf, Wattens (AT); Matthias Gander, Landeck (AT); Herbert Oefner, Wattens (AT); Bernhard Hofer, Telfes (AT)

(73) Assignee: D. Swarovski & Co., Wattens (AU)

( * ) Notice: Subject to any disclaimer, the term of this patent is extended or adjusted under 35 U.S.C. 154(b) by 2 days.

(21) Appl. No.: 10/213,110

(22) Filed: Aug. 7, 2002

(65) Prior Publication Data

US 2003/0031827 A1 Feb. 13, 2003

(30) Foreign Application Priority Data

Aug. 8, 2001 (AT) .................................. GM625/2001 U

(51) Int. Cl.$^7$ ................................................. B32B 5/16
(52) U.S. Cl. ........................ 428/149; 428/143; 428/101; 428/325; 63/1.16; 63/14.9; 63/38
(58) Field of Search ................................. 428/143, 101, 428/149, 325; 63/1.16, 14.9, 38

(56) References Cited

U.S. PATENT DOCUMENTS

| | | | |
|---|---|---|---|
| 3,377,184 A | | 4/1968 | Kukoff |
| 4,328,274 A | * | 5/1982 | Tarbutton et al. ............ 428/149 |
| 4,849,265 A | * | 7/1989 | Ueda et al. ................. 428/40.4 |
| 6,472,039 B1 | * | 10/2002 | Amen-Ra A ................ 428/42.1 |

FOREIGN PATENT DOCUMENTS

| | | |
|---|---|---|
| AT | 003268 U1 | 12/1999 |
| EP | 1013476 A1 | 6/2000 |
| JP | 2001-146691 | 5/2001 |
| WO | 97/16754 | 5/1997 |

* cited by examiner

Primary Examiner—William P. Watkins III
(74) Attorney, Agent, or Firm—Wenderoth, Lind & Ponack, L.L.P.

(57) ABSTRACT

An apparatus is used to apply glass elements with a non-mirrored rear side to, in particular, a textile substrate. The predominant proportion of the glass elements is in the form of balls (1). At least 5% of the glass elements comprise flat boundary surfaces, and the glass elements are applied to the front side (3) of a foil (5) to form a surface. At least a portion of the glass elements comprises balls (1) provided with facets (2).

12 Claims, 1 Drawing Sheet

APPARATUS FOR APPLYING GLASS ELEMENTS TO A SUBSTRATE

BACKGROUND OF THE INVENTION

The invention relates to an apparatus for applying glass elements with a non-mirrored rear side to, in particular, a textile substrate, wherein the predominant proportion of the glass elements is in the form of balls, at least 5% of the glass elements have flat boundary surfaces, and the glass elements are applied to the front side of a foil to form a surface.

If a pattern is to be formed with faceted stones, it is the usual practice for the stones to be connected to a carrier foil at the front side thereof in the form of that pattern. Apparatuses of that kind for applying patterns, in particular comprising small cut glass stones, to textiles, have long been known (see AT 360 627 B). The essential aspect in regard to the process for the production thereof is the step of coating the decorative elements with a hot melt adhesive. For the coating procedure the elements are fixed on a carrier band and coated jointly with liquid hot melt adhesive by means of a coating roller. After the adhesive cools down, the stones can be individually manipulated and can be connected to a carrier foil in the pattern form. After a protective foil which covers the adhesive surfaces during transportation has been pulled off, the carrier foil together with the elements fixed thereto is laid onto the substrate in such a way that the rear side of the elements, which is provided with the adhesive, bears against the substrate. The adhesive is activated and joined to the substrate by the application of heat and pressure, usually by ironing.

The glass elements used are usually mirrored or reflective at their rear side, for example by vapour deposition thereon with an aluminium layer which can be covered by a protective layer of chromium. Provided between the mirroring and the hot melt adhesive, which is transparent in itself, is an opaque adhesive primer for effecting bonding between the hot melt adhesive and the protective layer. AT 003 268 U1 however already describes that, when using glass elements with a non-mirrored rear side, it is possible to achieve combination effects between the color of the textile background and the refractive properties or color of the glass elements.

SUMMARY OF THE INVENTION

The object of the invention, while retaining that advantage, is to cover entire surface regions with glass elements which are non-mirrored at the rear side. In carrying that concept into effect, it is appropriate for the glass elements no longer to be individually provided with an adhesive, but for fixing of the stones on the substrate to be implemented by means of a foil, at the front side of which the stones are pressed in.

WO 97/16754 (Minnesota Mining and Manufacturing Company) discloses a foil which is coated with a mixture of glass balls and glass fragments or splinters. In that respect the presence of the glass fragments is a consequence, which in itself is unwanted, of the manufacturing process. Even if a positive effect on the appearance of the foil is attributed to the fragments, it is on the other hand nonetheless recognized that they worsen the mechanical properties of the product, in particular if they project further above the surface than the balls. In comparison therewith the object of the invention is to achieve the glitter effect produced by reflective flat surfaces without adversely affecting the mechanical homogeneity of the surface of the product. In particular the increase in the coefficient of friction, which is caused by irregular fragments, is avoided if it is provided that at least a part of the glass elements comprises balls provided with facets.

In contrast to glass fragments or splinters, balls provided with facets alter the surface properties of the product only slightly in comparison with a foil which is only occupied by balls. That apples in particular if it is provided that fewer than 25% of the glass elements comprise facetted balls.

BRIEF DESCRIPTION OF THE DRAWINGS

Details of the Invention are described with reference to the drawing in which.

DETAILED DESCRIPTION OF THE PREFERRED EMBODIMENT

Figure 1:
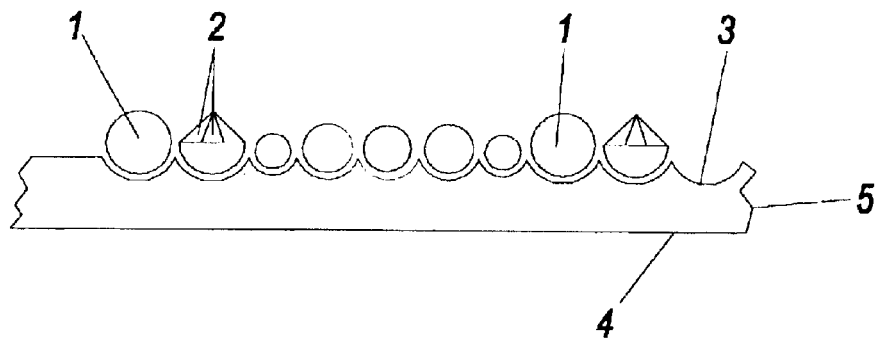
FIG. 1 shows a side view of the apparatus according to the innovation.

The product illustrated in FIG. 1 substantially comprises a foil 5 of plastic material, in the front side 3 of which are inserted glass elements. They occupy surface portions of the front side as completely as possible. They involve on the one hand glass balls 1 (ballotini) of a diameter of between 0.15 and preferably not over 1.2 mm. In the case of a smaller diameter the individual elements can no longer be sufficiently perceived from the usual distance, while in the case of a larger diameter the mechanical load-bearing capacity of the connection between the elements and the foil is no longer sufficiently high.

The balls 1 and the glass elements provided with facets 2 are usually heated and thereby locally cause the front side 3 of the foil 5 to melt so that they are up to half accommodated by the foil, which can be coated with a hot melt adhesive.

Figure 2:
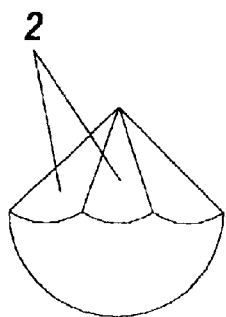
FIG. 2 shows a side view on an enlarged scale of a ball provided with an 8-facet tip.
Figure 3:
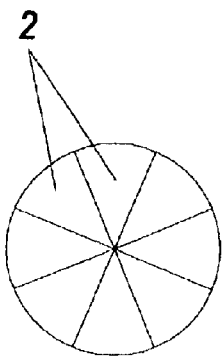
FIG. 3 shows the corresponding plan view of FIG. 2.

At least 5%, but for reasons of cost as far as possible not more than 20%, of the glass balls are provided with facets 2. Those facets are necessary in order to achieve a precious stone-like glitter effect. As the faceted glass elements are produced by partially grinding balls 1, they do not appear as foreign bodies. An element of that kind can be seen from FIGS. 2 and 3.

The operation of applying the product shown in FIG. 1 to a textile substrate can be effected by ironing, for which purpose the rear side 4 of the foil 5 can be coated with a hot melt adhesive. Sewing on would also be possible.

In order, admittedly, to modify the color of the background by the application, but nonetheless to show it off to advantage as such, it is desirable if the foil 5 comprises clear transparent material. If the foil is to be stretchable, it is desirable to use polyurethane for that purpose. Particular color effects can be achieved if the glass elements are subjected to vapour deposition in known manner and thereby appear color under incident light.

What is claimed is:

1. Apparatus for applying glass elements with a non-mirrored rear side to an in particular textile substrate, wherein the predominant proportion of the glass elements is in the form of balls, at least 5% of the glass elements comprise flat boundary surfaces, and the glass elements are applied to the front side of a foil to form a surface, characterised in that at least a portion of the glass elements comprises balls provided with facets.

2. Apparatus according to claim 1 characterised in that fewer than 25% of the glass elements are facetted balls.

3. Apparatus according to claim 1 characterised in that the size of the balls is between 0.15 and 1.5 mm.

4. Apparatus according to claim 1 characterised in that the balls are coloured in plan view.

5. Apparatus according to claim 4 characterised in that the balls are provided with interference-producing or absorbent layers.

6. An apparatus for applying glass elements to a substrate, comprising:

a foil having a front side; and a plurality of glass elements applied to said front side of said foil so as to form a surface;

wherein:

a majority of said glass elements on said front side of said foil are in the form of balls, said glass elements have a non-mirrored rear side on said front side of said foil, and at least 5% of said glass elements on said front side of said foil comprises balls having facets.

7. The apparatus of claim 6, wherein less than 25% of said glass elements on said front side of said foil comprises balls having facets.

8. The apparatus of claim 6, wherein less than 20% of said glass elements on said front side of said foil comprises balls having facets.

9. The apparatus of claim 6, wherein said plurality of glass elements are in a size range between 0.15 mm and 1.2 mm.

10. The apparatus of claim 6, wherein said balls are colored in plan view.

11. The apparatus of claim 6, wherein said foil comprises clear transparent material.

12. The apparatus of claim 6, wherein said foil has a rear side coated with a hot melt adhesive.

* * * * *